United States Patent [19]

Pappy

[11] Patent Number: 4,903,731
[45] Date of Patent: Feb. 27, 1990

[54] WATER CLOSET TANK FILL VALVE

[76] Inventor: George K. Pappy, 11809 Moon Beam Dr., Oklahoma City, Okla. 73162

[21] Appl. No.: 363,810

[22] Filed: Jun. 9, 1989

[51] Int. Cl.⁴ ............................................... B67D 5/30
[52] U.S. Cl. ................................. 137/624.11; 251/20; 222/20
[58] Field of Search ........................... 251/15, 20, 74; 137/624.11, 624.22; 222/20

[56] References Cited

U.S. PATENT DOCUMENTS

| | | | |
|---|---|---|---|
| 2,761,587 | 9/1956 | Schantz | 222/20 |
| 3,097,762 | 7/1963 | Charnota et al. | 222/20 |
| 3,169,666 | 2/1965 | Rinkewich | 222/20 |
| 3,473,695 | 10/1969 | Anesi | 222/20 |
| 3,638,682 | 2/1972 | Heyer et al. | 251/20 |
| 4,202,467 | 5/1980 | Rutten et al. | 222/20 |

Primary Examiner—A. Michael Chambers
Attorney, Agent, or Firm—Robert K. Rhea

[57] ABSTRACT

A water closet valve, automatically closed, following the passage of a predetermined quantity of water therethrough, includes a cylindrical housing having an inlet valve and water passageway at its depending end, is mounted within a water closet on its bottom wall. A manually triggered control wheel unseats the valve by a cam surface on the control wheel which permits water to enter the cylindrical housing and drive a water wheel, in turn driving a gear train connected with the control wheel for angular rotation of the control wheel and its camming surface to a valve closed position after a predetermined number of revolutions of the gears of the gear train.

9 Claims, 2 Drawing Sheets

WATER CLOSET TANK FILL VALVE

BACKGROUND OF THE INVENTION

1. Field of the invention.

This invention relates to water closets and more particularly to an inlet valve closed by water entering the tank, to close the valve.

It is well known that water closet mechanisms frequently malfunction and fail to close after flushing the water closet, as for example by a worn out ball float or foreign objects under or between the valve and it's seat which may result in numerous of gallons of water passing unused from the source of supply to the sewer system.

This invention will eliminate water waste, as a result of malfunctioning water closet components, by automatically shutting or closing the inlet valve to the water tank after a predetermined quantity of water flows through the inlet valve.

2. Description of Prior Art

The most pertinent prior patent is believed to be U.S. Pat.No. 2,761,587. This patent discloses a watertight housing having an inlet and outlet to be interposed in a hose or water supply line to a lawn sprinkler, or the like. This device includes a water driven wheel at the inlet end of its housing, which drives a gear train rotating a valve outlet control wheel, which closes the outlet valve after a predetermined quantity of water has passed through the housing.

This invention is distinctive over the above named patent by providing a valve inlet housing, containing a valve manually opened by flushing a water closet, which permits water from the supply to rotate a water wheel and a operate series of speed reducing gears and apply sufficient torque to angularly rotate a cam wheel and close a water valve inlet means after a predetermined number of revolutions of the gears in the gear train, whether or not the water closet tank has been filled to a predetermined level.

SUMMARY OF THE INVENTION

A generally cylindrical housing is provided with an inlet port at one end which is normally closed by an inlet valve. The inlet valve is opened and closed by a shaft engaging a camming surface of a control wheel, angularly rotated by flushing the water closet. The inlet valve connection has a branch tube discharging water against the vanes of a water wheel, driving a series of gears forming a gear train, which gradually applies torque to a shaft, having a gear thereon, mating with a gear rack on the inlet valve opening control wheel. After a predetermined number of revolutions of the gears in the gear train, the cam of the control wheel has been rotated to a position permitting a spring to bias inlet valve closed.

The principal object of this invention is to provide a water closet inlet valve control for retrofitting existing water tanks, or which may be installed as original equipment, and is primarily actuated by the inflow of water to close the water inlet in response to a predetermined number of revolutions of a gear train driven by a water wheel.

DESCRIPTION OF THE PREFERRED EMBODIMENTS

Figure 1:
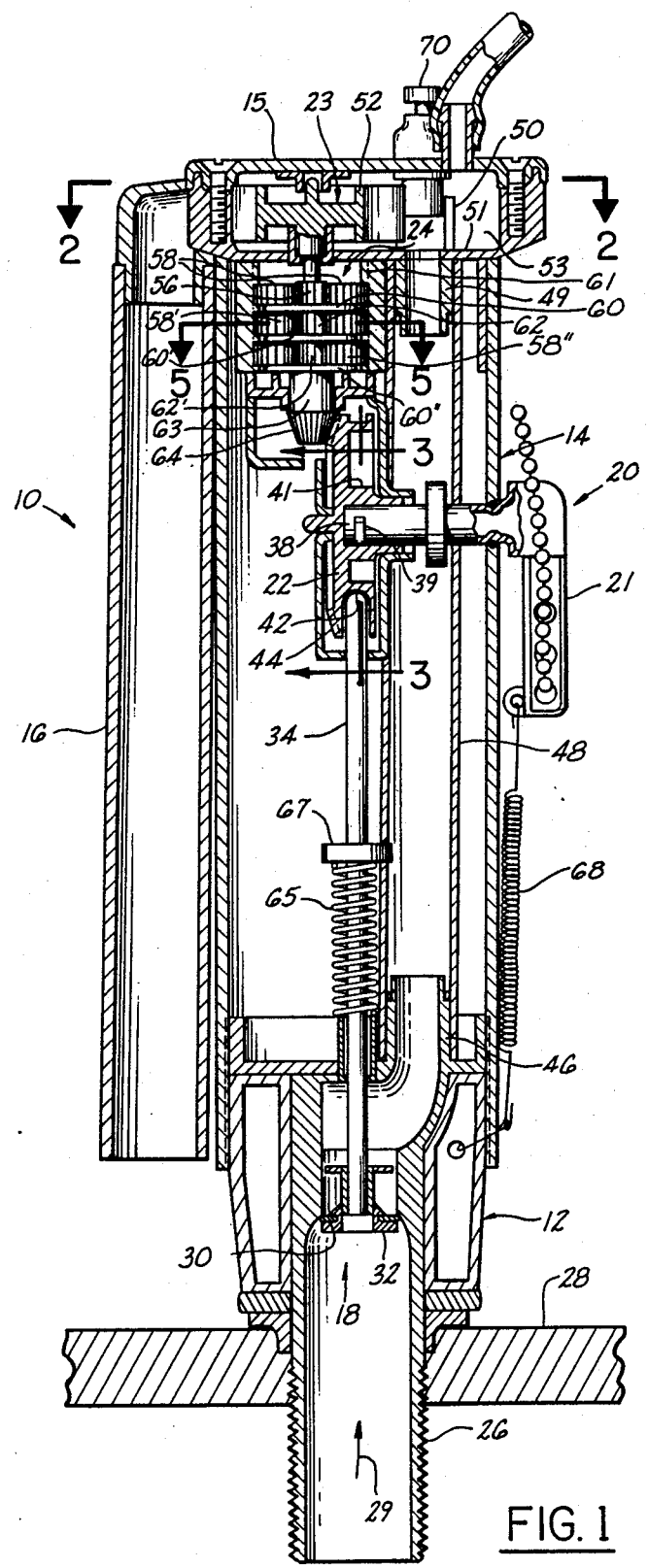
FIG. 1 is a vertical cross-sectional view of the device.
Figure 2:
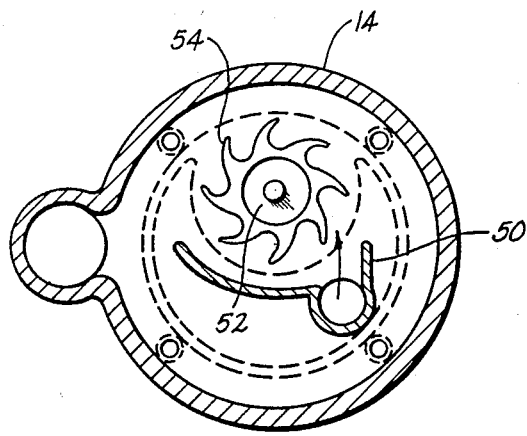
FIG. 2 is a horizontal sectional view taken substantially along the line 2—2 of FIG. 1.
Figure 4:
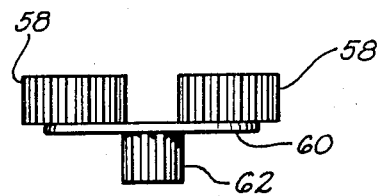
FIG. 4 is an side elevational view, to an enlarged scale, of one gear rack and gears forming one unit of a gear train.

Like characters of reference designate like parts in those figures of the drawings in which they occur.

In the drawings:

The reference numeral 10 indicates the device as a whole, which is cylindrical case-like in general configuration. The device 10 comprises a tube-like base housing 12 and a tubular upper housing 14, having a top wall 15 and having a drain tube 16 depending from its upper end portion.

The bore of the base housing 12 contains a valve means 18, initially opened by a manually triggered control means 20, including a lever 21 for angularly rotating a valve opening timing or cam wheel 22 in one direction and supplying water to a water wheel means 23 contained by the top end portion of the upper housing 14, with a gear train means 24, interposed between and connecting the water driven wheel means 23 with the manually triggered valve opening and closing means 20.

The base housing 12, includes a water inlet tube 26 connected with a water supply, not shown, and projects through and is sealed water tight with the bottom end wall 28 of a water closet in a conventional manner. The tube member 26, forms a fluid passageway 29 and is provided with an annular valve seat 30 on its inner wall surface, which seats and seals with a normally closed valve 32 to open and close the passageway 29. The valve 30 includes an elongated valve stem 34, extending axially upward into the upper housing 14.

The manually triggered control means lever 21 is mounted on and projects inwardly at one end through the wall of the upper housing to form a lever stem 38 axially connected by oneway ratchet teeth and rack means 39 to the valve control cam wheel 22. The cam wheel is provided with a hub 41 surrounding the stem 38 and a circumferential camming surface 42, in frictional contact with the top end of the valve stem 34. The cam surface is characterized by a radially disposed stop surface 43 laterally abutting the top end portion of the valve stem 34 when the valve 32 is seated. The cam wheel 22 includes a circumferential rack of teeth 44 adjacent its periphery, opposite the lever 21 for the purposes presently explained.

The inlet tube 26 is provided with a lateral and upwardly extending tube portion 46 offset with respect to the axis of the valve stem 34. The tube portion 46 is connected with one end of a tube 48, having its upper or top end connected with a tubular inlet 49 depending from a horizontal partition 51, spaced below the casing top 15 and defining the lower limit of a water wheel compartment 53, and forming a part of the water wheel means 23. The partition 51 supports a water outlet bracket 50 horizontally journalling a water wheel 52. The bracket 50 directs water in a tangential direction toward the vanes 54 of the water wheel. The axle of the water wheel axially supports a pinion 56 at its depending end. Water driving the water wheel drains from the housing top through the drain tube 16 to fill the water closet. The depending end portion of the tube 16 is normally disposed below the level of water, not shown, in the water closet 28 for noise suppression.

Angular rotation of the water wheel 52 by the flow of water rotating it and its pinion 56, drives a pair of spur gears 58, horizontally journalled in 180° spaced relation on a planar generally circular gear rack 60, similarly having a depending axial drive pinion 62 which forms one unit of three superposed units forming the gears of thetrain 24. The gears of the gear train 24 are housed by an annular wall 61 depending from the partition 51. The inner wall surface of the wall 61 is provided with an annular array of gear teeth 61' cooperatively engaged by the teeth of the spur gears 5 projecting beyond the periphery of the rack 60 for angularly rotating the latter and its pinion 62.

The drive pinion 62 in turn angularly rotates a second pair of spur gears 58' on a second gear rack 60' having a second drive pinion 62' depending from its axis, which in turn, drives a third set or pair of spur gears 58" mounted on and secured to a third gear rack 60" connected, by a one-way ratchet means 63, with a depending drive pinion 64 for cooperatively engaging the control wheel gear teeth 44.

After a predetermined number of revolutions of the water wheel 52, the control wheel 22 is rotated in the direction of the arrow 66, until the valve stem 34 is urged toward a valve closed position, adjacent the cam shoulder 43. A spring 65 surrounding the valve stem 34 between the base housing 12 and a stop 67 axially secured to the stem snaps the valve 32 closed with its seat when the top end of the valve stem reaches the intersection of the cam surface 42' with the radial shoulder 43.

By way of example, the ratio of the pinion and spur gear teeth is such that six revolutions of the water wheel 52 (and its pinion 56) angularly rotating the spur gears 58 rotates the gear rack 60 through 360°. Similarly six revolutions of the gear rack 60 is required for its pinion 62 to angularly rotate the gear rack 60' through 360° and so on.

The control wheel lever 21 is connected with the manually operated flush lever on the exterior of the water tank, not shown, in a manner to angularly rotate the lever 21 and the control wheel 22 in the direction of the arrow 66. The connection between the lever 21 and the manually tripped water closet lever is such that the control wheel is angularly rotated a distance sufficient to position the top end of the valve stem 34 on the circular portion 42' of the camming surface. In addition to a predetermined number of revolutions of the water wheel and gear train gears for closing the valve, further adjustments of the quantity of water entering the water closet may be controlled by limiting angular rotation of the control wheel 22 to a predetermined arc and thus the position of the valve stem on the cam surface 42' by the adjustable connection between the control wheel lever 21 and the water closet manually operated lever.

Additionally, a control knob 70 at the top end of the upper housing permits restricting the quantity of water flowing against the vanes of the water wheel 52 to limit the amount of water entering the water closet.

OPERATION

Figure 3:
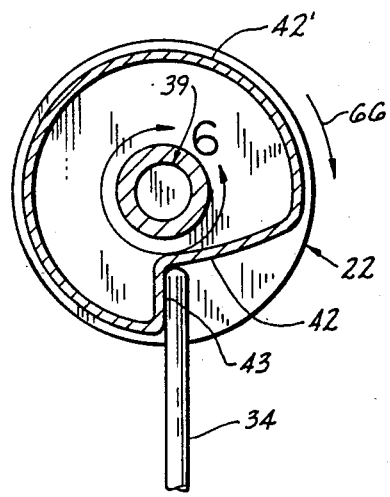
FIG. 3 is a fragmentary vertical cross-sectional taken substantially along the line 3—3 of FIG. 1.
Figure 5:
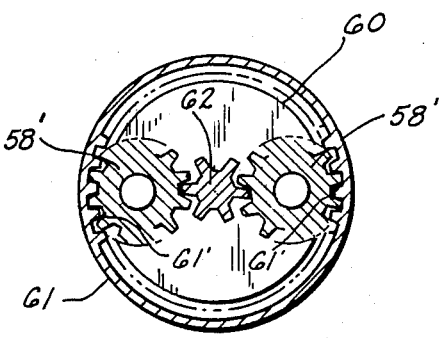
FIG. 5 is a horizontal sectional view taken substantially along the line 5—5 of FIG. 1; and, FIG. 6 is an enlarged cross section detail of the one-way ratchet encompassed by the line 6.
Figure 6:
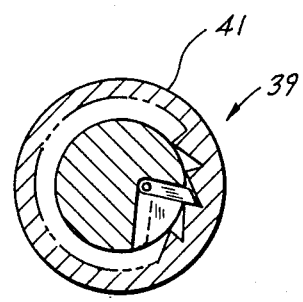

In operation, the lever 21 is angularly rotated by manually tripping the water closet trip lever, not shown, which lifts the water discharge valve of the water closet, not shown, and exhausts the water therefrom. Rotation of the lever 21 in the direction of the arrow 66 (FIG. 3), similarly rotates the control wheel 22 permitted by the action of the one-way ratchet means 63, which positions the upper end of the valve stem 34 on a portion of the circular camming surface 42' thus opening the valve 32. Simultaneously water, from the supply entering the inlet passageway 29, flows through the tube 48 and begins rotating the water wheel 52, in turn driving the spur gears and pinions of the gear train 24 and angularly rotating the control wheel 22 in the direction of the arrow 66. Angular rotation of the control wheel relative to the lever stem 38 is permitted by the ratchet means 39.

This action continues until a predetermined number of revolutions of the gears and the water wheel positions the valve stem 34 at the juncture of the camming surface 42' with the shoulder 43 so that the spring 65 urges the valve stem to the cam surface 42, thus abruptly closing the valve 32 and stopping inflow of water, whether or not the water tank has been filled. Thus when malfunction of the drain closing components of the water has failed to close, water is discontinued from entering the water closet.

Obviously the invention is susceptible to changes or alterations without defeating its practicability. Therefore, I do not wish to be confined to the preferred embodiment shown in the drawings and described herein.

I claim:

1. A self closing valve for a water closet tank, comprising:

an upright casing having a top and having a depending inlet tube forming a water inlet port;

a valve seat in the inlet port;

a valve mating with said seat for opening and closing the inlet port, said valve having an upstanding stem;

control wheel means including a wheel having a gear rack adjacent its periphery and having a camming surface bearing against the end of said valve stem opposite the valve for seating or unseating said valve in accordance with the angular position of said control wheel;

means biasing said valve toward the valve seat;

water wheel means including a water wheel having radially disposed vanes journalled by the casing adjacent its top;

tube means communicating at one end with the inlet port downstream from the valve seat and having its other end disposed adjacent the water wheel means in water wheel angular rotating position; and, water wheel driven gear train means operatively interposed between said water wheel and said control wheel for angularly rotating said control wheel to a valve closed position in response to a predetermined number of revolutions of said water wheel.

2. The valve according to claim 1 in which the control means further includes:

an axial hub on the control wheel; and, a lever having a lever stem projecting through the wall of said casing and coaxially entering the control wheel hub for angularly rotating the control wheel manually.

3. The valve according to claim 2 in which the control means further includes:

ratchet means connecting said lever stem with the control wheel hub for manually rotating said lever and said control wheel in one direction as a unit about the axis of said lever stem and permitting angular rotation of said control wheel relative to said lever in said one direction by said gear train means.

4. The valve according to claim 3 and further including:

a horizontal partition adjacent said casing top for forming a water wheel compartment surrounding said water wheel;

bracket means in said water wheel compartment for directing water in a tangential direction toward said water wheel; and, a drain tube communicating with the water compartment.

5. The valve according to claim 4 in which the water wheel
further includes:

an axle depending through said partition; and, a water wheel pinion on the water wheel axle for driving said gear train means.

6. The valve according to claim 5 and further including:

a driven pinion depending from said gear train means and drivably engaged with the gear rack on said control wheel; and, other ratchet means interposed between said gear train means and said driven pinion for angularly rotating said control wheel in said one direction and permitting manual angular rotation of said control wheel in said one direction independently of said gear train means.

7. The valve according to claim 1 and further including:

a horizontal partition adjacent said casing top for forming a water wheel compartment surrounding said water wheel;

bracket means in said water wheel compartment for directing water in a tangential direction toward said water wheel; and, a drain tube communicating with the water compartment.

8. The valve according to claim 7 in which the water wheel
further includes:

an axle depending through said partition; and, a pinion on the water wheel axle for driving said gear train means.

9. The valve according to claim 8 and further including:

a driven pinion depending from said gear train means and drivably engaged with the gear rack on said control wheel; and, other ratchet means interposed between said gear train means said driven pinion for angularly rotating said control wheel in said one direction and permitting manual angular rotation of said control wheel in said one direction independently of said gear train means.

* * * * *